United States Patent [19]

Chang

[11] Patent Number: 4,818,045
[45] Date of Patent: Apr. 4, 1989

[54] HOLOGRAPHIC OPTICAL ELEMENT HAVING PERIPHERY WITH GRADUALLY DECREASING DIFFRACTION EFFICIENCY AND METHOD OF CONSTRUCTION

[75] Inventor: B. Jin Chang, Ann Arbor, Mich.

[73] Assignee: Kaiser Optical Systems, Ann Arbor, Mich.

[21] Appl. No.: 138,872

[22] Filed: Dec. 29, 1987

[51] Int. Cl.$^4$ ............................ G02B 5/32; G02B 27/10
[52] U.S. Cl. ...................................... 350/3.7; 350/3.81; 350/3.83; 350/174
[58] Field of Search ...................... 350/3.7, 3.81, 3.83, 350/320, 448, 174, 3.72

[56] References Cited

U.S. PATENT DOCUMENTS 4,355,858 10/1982 Funoto et al. ...................... 350/3.72
4,478,490 10/1984 Wreede et al. ...................... 350/440

OTHER PUBLICATIONS

"Fabrication of Oxodized Apertures for Laser Beam Attenuation", Optics and Laser Technology, Apr. 1975, pp. 75-79.

Primary Examiner—Bruce Y. Arnold
Attorney, Agent, or Firm—Krass & Young

[57] ABSTRACT

The present invention is a technique for fabrication of a holographic optical element combiner having a high diffraction efficiency at a central portion and gradually decreasing diffraction efficiencies for peripheral portions at locations further from the central portion. The holographic optical element combiner is constructed by exposing a photosensitive material and either selectively diffusing the construction beam with moving diffuser plate or plates or selectively blocking the construction beam with opaque plate or plates. The peripheral portions are directly exposed for a gradually decreasing fraction of the exposure time for locations further from the central portion. The preferred embodiment employs diffuser plate or plates in order to achieve the same exposure bias level throughout the photosensitive material. When a holographic optical element combiner of this construction is employed in a head up display, the visibility of the edge of the combiner is reduced. In the preferred embodiment the holographic optical element combiner is embedded in a windshield glass structure.

24 Claims, 4 Drawing Sheets

HOLOGRAPHIC OPTICAL ELEMENT HAVING PERIPHERY WITH GRADUALLY DECREASING DIFFRACTION EFFICIENCY AND METHOD OF CONSTRUCTION

TECHNICAL FIELD OF THE INVENTION

The technical field of the present invention is the field of holographic optical elements and particularly holographic optical elements employed in vehicle head-up display systems.

BACKGROUND OF THE INVENTION

It is heretofore been known in the art to provide head-up display systems in vehicles for projecting information related to the operation of the vehicle over the real world view through a windshield. The reason for this display is to enable the operator of the vehicle to view the information supplied to the head-up display without removing his eyes from the real world as viewed through this windshield.

Heretofore the combiner used with the heads up display has been separate from the windshield. It would be advantageous to include the combiner for the heads up display in the windshield, thereby minimizing the amount of supporting structure required, and reducing the potential for obstruction of the view of the outside world. It would further be advantageous for the combiner to be constructed in such a way that the edges are not visible to the user.

It is heretofore known in the art to use holographic optical elements for the combiners and such head up displays. A holographic optical element is a generally layered device having an interference pattern therein. In accordance with the known art holographic optical elements are ordinarily constructed of dichromated gelatin which has been exposed to an interference pattern of coherent light and developed. Such a dichromated gelatin layer when developed embodies the interference pattern in varying indices of refraction. These holographic optical elements can be constructed so as to efficiently reflect light of particular wavelengths while not obstructing the visibility through the device at other wavelengths. Thus, for example, the display of a cathode ray tube phosphor having a particular wavelength can be made to be reflected to the user via such a holographic optical element, while the holographic optical element provides minimum obstruction of other wavelengths passing through.

There has heretofore been no convenient manner of forming such a holographic optical element into the windshield of the vehicle, nor of reducing the visibility of the edges of such a holographic optical element to the user during ordinary use.

SUMMARY OF THE INVENTION

The primary object of the present invention is to provide a manner for construction of a holographic optical element, which can be embedded in the windshield of a vehicle employing a heads up display, which has a substantially invisible periphery.

This object is achieved in the manner of construction of the holographic optical element. The central portion of the holographic optical element is formed by exposure to a construction beam having a predetermined coherence during the entirety of an exposure period and the peripheral portion is formed by exposure to the construction beam during a gradually decreasing portion of the exposure period. This enables formation of a holographic optical element having high contrast interference fringes in the central portion thereof and interference fringes having gradually decreasing contrast in the periphery. The center region having relatively high contrast provides reflection of the display source with a maximum of efficiency. On the other hand, the peripheral portions having gradually decreasing contrast of interference fringes serves as a soft or smooth edge. This structure essentially eliminates the visibility of the edge of the holographic optical element, thereby minimizing the interference with the vision of the outside world such an edge would create.

The required construction beam which produces a central portion of high contrast interference fringes and peripheral portions having gradually decreasing contrast interference fringes can be formed in a number of differing ways. In the preferred embodiment the construction beam is derived from a coherent light source with its coherence length reduced in accordance with the teachings of U.S. patent application Ser. No. 927,341 filed Nov. 4, 1986 entitled "Method for Forming Holographic Optical Elements Free of Secondary Fringes" which is a continuation of U.S. patent application Ser. No. 613,901 filed May 24, 1984, now abandoned. In accordance with the teachings of that prior U.S. patent application this reduced coherence length enables the formation of the desired primary interference fringes in the holographic optical element while virtually eliminating the incidence of secondary interference fringes. A first method of forming a construction beam producing a central portion having high contrast interference fringes and peripheral portions having gradually decreasing constrast interference fringes uses a uniform diffuser plate having a central aperture. Coherent illumination through the central aperture reaches the dichromated gelatin employed for construction of the holographic optical element without further loss of coherence. Light reaching the dichromated gelatin layer through the uniform diffuser plate has such a further reduced coherence that interference fringes do not form. In accordance with the present invention this diffuser plate is moving during the exposure of the holographic optical element, thereby causing the average interference fringe contrast over the time of the exposure at the peripheral portions to gradually decrease toward the periphery.

In accordance with one embodiment of the present invention the central aperture is generally rectangular with the diffuser plate moved in such a manner that the motion is perpendicular to each of the four sides of the rectangular aperture during at least some portion of the exposure time.

In accordance with another embodiment of the present application the central aperture is generally circular with a sawtooth shape at the periphery thereof. The motion of this diffuser plate is rotation about the center of the central aperture. The sawtooth pattern causes areas of the holographic optical element further toward the periphery to receive light which is passed through the diffuser plate for a greater portion of the time of exposure than those portions nearer the interior of the sawtooth pattern. The motion of the diffuser plate having a central aperture can be either circular or elliptical about some point within the central aperture.

In accordance with a further embodiment of the present invention the selectable diffusion can be provided by a plurality of at least three diffuser plates which have interior edges forming a central aperture in the form of a polygon. During exposure each diffuser plate is moved in a direction perpendicular to this interior edge, the side of the polygon.

In accordance with a still further embodiment of the present application, a moving diffuser with a central aperture is employed. The diffuser is moved along the line of the light from the exposure source. This causes more or less of the photosensitive medium to be exposed depending on whether the diffuser is nearer or further from the light source.

In accordance with a still further embodiment of the present invention, any of the above noted techniques may be employed using opaque elements rather than diffuser plates.

In accordance with a further embodiment of the present invention the developed holographic optical element is packaged in a manner enabling easy embedding within the windshield of the vehicle. In accordance with the known processes for producing such holographic optical elements, the dichromated gelatin layer is disposed on a transparent supporting substrate. After exposure and development of the holographic optical element, this holographic optical element layer is covered by a transparent cover plate. In accordance with the preferred embodiment of the present invention both the transparent supporting substrate and the transparent cover plate are formed of glass having a thickness of at least 0.050 inches. Both the transparent supporting substrate and the transparent cover plate are then ground to remove material to leave a layer of between 0.020 inches and 0.040 inches. The resulting structure is flexible enough and stable enough to be laminated between layers of glass during the construction of ordinary safety glass. Alternately, a transparent cover plate having an initial thickness in the range of 0.020 inches to 0.040 inches may be employed and only the transparent supporting substrate need be ground. In accordance with the prior art safety glass is formed by adhering two pieces of glass to a central transparent polyvinyl butyral layer. The central polyvinyl butyral layer provides additional strength and shatterproofing for the two layers of glass. In accordance with the present invention, the holographic optical element formed in the manner described above can be placed within this laminating polyvinyl butyral.

BRIEF DESCRIPTION OF THE DRAWINGS

These and other aspects and objects of the present invention will become clear from the foregoing description, taken in conjunction with the figures in which.

DETAILED DESCRIPTION OF THE PREFERRED EMBODIMENTS

A description will now be made of a construction of the holographic optical element in accordance with the principles of the present invention.

Figure 1:
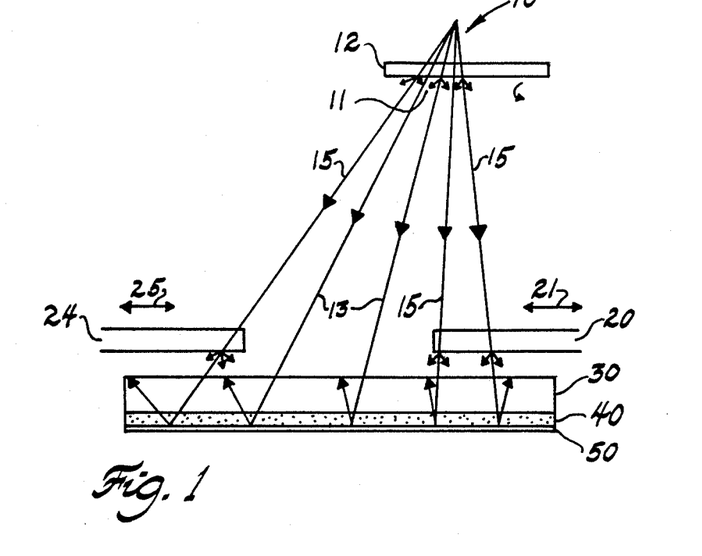
FIG. 1 illustrates the exposure of the photosensitive layer to a coherent light source which is one step in the formation of the holographic optical element heads up display combiner of the present invention.

FIG. 1 illustrates an essential step in the formation of the holographic optical element, that of exposure of a photosensitive layer to a coherent light source. FIG. 1 illustrates a coherent light source 10, which may be, for example, a laser point source. In accordance with the teachings of U.S. patent application Ser. No. 927,341 filed Nov. 4, 1986 entitled "Method for Forming Holographic Optical Elements Free of Secondary Fringes" which is a continuation of U.S. patent application Ser. No. 613,901 filed May 24, 1984, now abandoned, the highly coherent light from coherent light source 10 is passed through a moving diffuser plate 12 forming small extended light source 11, as a spot on the far side of diffuser plate 12. Diffuser plate 12 reduces the spatial coherence of the light from coherent light source 10 thereby reducing the coherence length of this light. This is illustrated schematically in FIG. 1 via the slight scattering of light from small extended light source 11. The reduced coherence length is greater than the thickness of the photosensitive layer along the path of the exposure beam and less than the least thickness of the transparent supporting substrate 30 along the path of the exposure beam. As taught in the above cited patent application, this reduction in coherence length permits the formation of primary interference fringes of high contrast but virtually eliminates spurious secondary interference fringes caused by internal reflections of the exposing light.

This combination of coherent light source 10 and moving diffuser plate 12 creates a small extended light source 11 having central rays 13 and peripheral rays 15. These light rays are employed to expose photosensitive layer 40. Photosensitive layer 40 is disposed on one surface of transparent supporting substrate 30. A reflecting layer 50 is disposed on the surface of photosensitive layer 40 opposite to transparent supporting substrate 30. In accordance with principles known in the art, photosensitive layer 40 may include dichromated gelatin. The exposure to coherent light in this manner induces an interference pattern within photosensitive layer 40 between the light directly incident from point source 10 and the light reflected by reflecting layer 50. It is known in the art that such a geometry produces an interference fringe pattern within photosensitive medium layer 40 which produces a reflection holographic optical element. It should be understood that the geometry between small extended light source 11 and the photosensitive medium layer 40 must be selected, in accordance with principles known in the art, in order to provide the desired reflectivity at the desired wavelength during use of the completed holographic optical element.

The exposure of the peripheral portions of the photosensitive layer 40 are modified by diffuser plates 20 and 24. In accordance with one embodiment of the present invention, diffuser plates 20 and 24 may comprise separate structures. However, as will be seen below, diffuser plates 20 and 24 may be part of the same unitary structure. Diffuser plate 20 is moved back and forth parallel to the transparent supporting substrate 30 along the line indicated by arrows 21. Similarly, diffuser plate 24 is moved back and forth parallel to transparent supporting substrate 30 along the line indicated by arrows 25.

The motion of diffuser plates 20 and 24 creates two distinct regions within photosensitive layer 40. The first region is a central region which always receives rays 13 from small extended light source 11 without interference by either diffuser plate 20 or diffuser plate 24. In this region interference is formed having a maximum contrast during the entire exposure of photosensitive layer 40. A second peripheral region is also formed. In this peripheral region light is sometimes received directly from small extended light source 11 and sometimes received after it has passed through either diffuser plate 20 or diffuser plate 24. Passage of one of rays 15 through diffuser plate 20 or diffuser plate 24 serves to further reduce the coherence of this light to the point that no interference fringes are formed within photosensitive layer 40. This is illustrated schematically in FIG. 1 as further scattering of light rays 15. The more central portions of this peripheral region will receive light directly from small extended light source 11 for a greater portion of the exposure time than the more distant portions of this peripheral region. As a result, the average interference contrast within photosensitive layer 40 during the time of the exposure thereof, will gradually decrease from the central portion to the extreme peripheral portion. This decrease in the interference contrast causes a consequent decrease in the diffraction efficiency of the resulting holographic optical element, as will be further detailed below.

Figure 2:
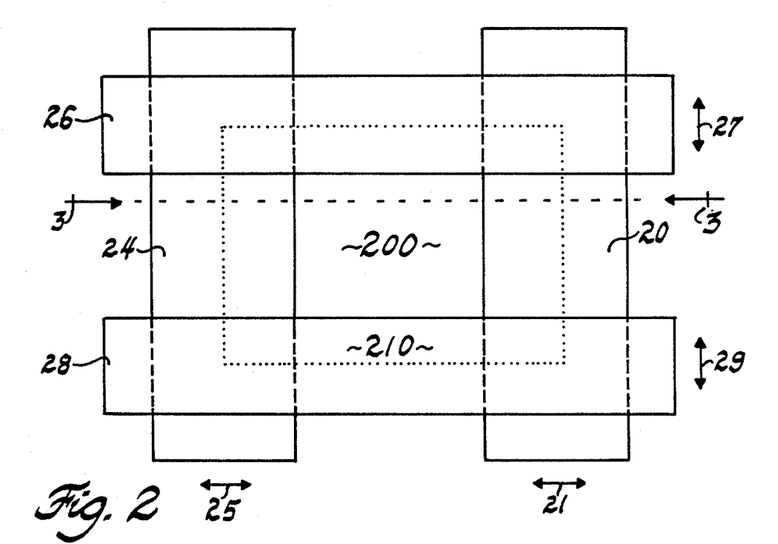
FIG. 2 illustrates a manner of employing four diffuser strips for providing the reduced interference contrast at the peripheral portions of the holographic optical element.

FIG. 2 illustrates a plan view of the structure shown in cross section in FIG. 1. FIG. 2 illustrates diffuser plates 20 and diffuser plates 24. In addition, FIG. 2 illustrates diffuser plates 26 and 28, disposed perpendicular to diffuser plates 20 and 24. Diffuser plate 26 is moved back and forth parallel to transparent supporting substrate 30 along the path illustrated by arrows 27. Similarly, diffuser plate 28 is moved back and forth along the path illustrated by arrows 29. The combined motion of diffuser plates 20, 24, 26 and 28 forms a central region 200 of exposure having maximum interference contrast, and a peripheral portion 210 having ah exposure of a decreasing interference contrast for regions removed from the central region.

Although FIG. 2 illustrates four diffuser plates forming a rectangular structure, this is not necessary for the practice of the present invention. Any number of diffuser plates greater than three which are disposed to provide a polygonal central portion 200 can be employed. It is necessary for at least some component of the motion of the diffuser plates to be perpendicular to the interior edges forming the central polygonal aperture. Other than these limitations, any number of diffuser plates can be employed.

After exposure of photosensitive layer 40 in the manner described, this photosensitive layer is developed in a manner known in the prior art. After developing and drying the photosensitive layer 40, it is generally covered by a transparent cover plate to prevent further exposure to moisture. Each of these steps is known in the prior art and will not be further described.

Figure 3:
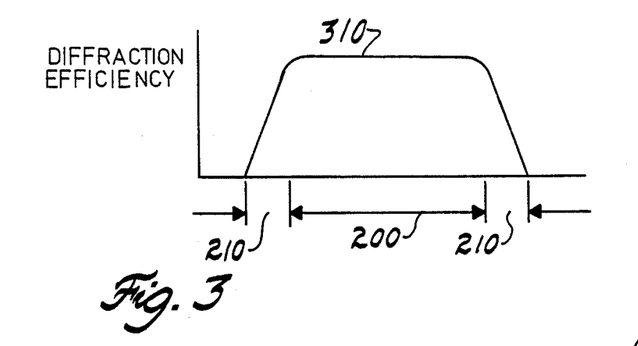
FIG. 3 illustrates a plot of the diffraction efficiency of the holographic optical element formed in this manner at a cross section of the holographic optical element taken along the line 3—3 illustrated in FIG. 2.

FIG. 3 illustrates a plot of the resulting diffraction efficiency in the completed holographic optical element taken along the line 3—3 illustrated in FIG. 2. Curve 310 shows the diffraction efficiency within the two regions illustrated in FIG. 2. Within the center region 200, the diffraction efficiency 310 is at a maximum. This diffraction efficiency reduces smoothly to a minimum near zero at each of the peripheral regions 210.

In accordance with the principles of the present invention this gradual reduction of the diffraction efficiency at the peripheral portions of the completed holographic optical element serves to make the edge of the holographic optical element substantially invisible. Because of the expense in producing such a holographic optical element as a combiner for a heads up display, it is not proposed that the entire windshield include such a combiner. The combiner is constructed only so large as necessary for the particular purpose of the heads up display. A holographic optical element combiner produced in accordance with the prior art would leave a visible division at the edge of the holographic optical element. When the holographic optical element is constructed in accordance with the teachings of the present application outlined above, the gradual reduction in diffraction efficiency causes a soft edge for the holographic optical element. This substantially reduces the visibility to user of the edge of the holographic optical element, thereby reducing the distraction this edge can involve.

A holographic optical element can be constructed having the gradually reducing diffraction efficiency of the periphery through a number of different diffusing techniques. Some of these techniques are illustrated in FIGS. 4, 5 and 6.

Figure 4:
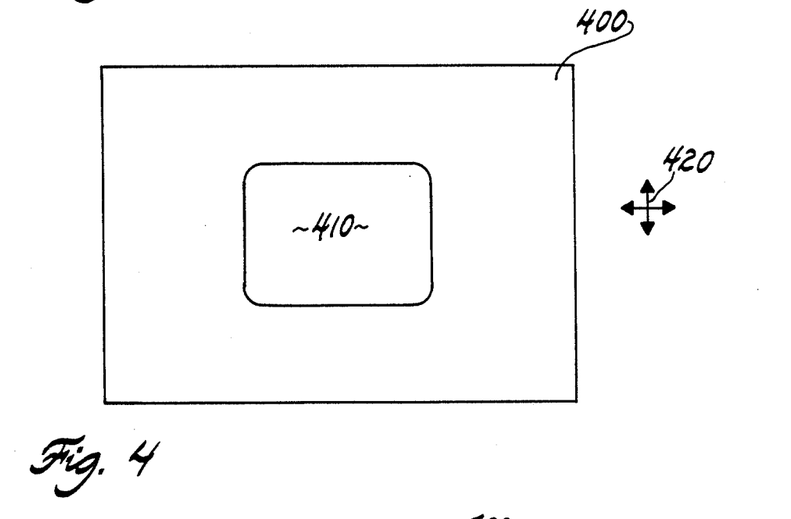
FIG. 4 illustrates a fixed diffuser plate having a central aperture, which can be employed in the present invention to provide the gradually decreasing diffraction efficiency at the periphery.

FIG. 4 illustrates generally rectangular diffuser plate 400. Rectangular diffuser plate 400 includes a generally rectangular central aperture 410. In accordance with the present invention diffuser plate 400 in placed between coherent light point source 10 and photosensitive layer 40 during exposure of photosensitive layer 40. Diffuser plate 400 is moved in mutually perpendicular direction as illustrated by arrows 420. This motion of diffuser plate 400 is generally equivalent to the motion of the four diffusion plates 20, 24, 26 and 28 illustrated in FIG. 2. The net effect of this motion along the two perpendicular axes is the same, that is the production of a gradually decreasing diffraction efficiency toward the periphery of the completed holographic optical element.

Figure 5:
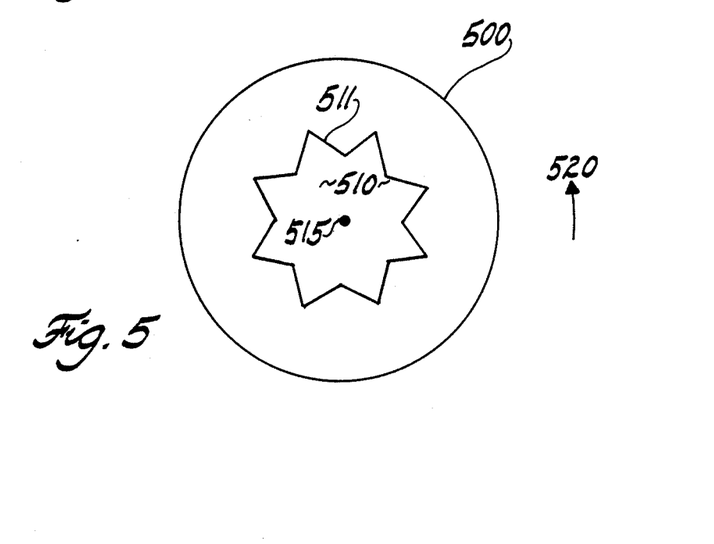
FIG. 5 illustrates a fixed diffuser plate having a generally circular central aperture with a sawtooth pattern on its periphery, which can be employed for providing the gradually reduced diffraction efficiency at the periphery of the holographic optical element.
Figure 6:
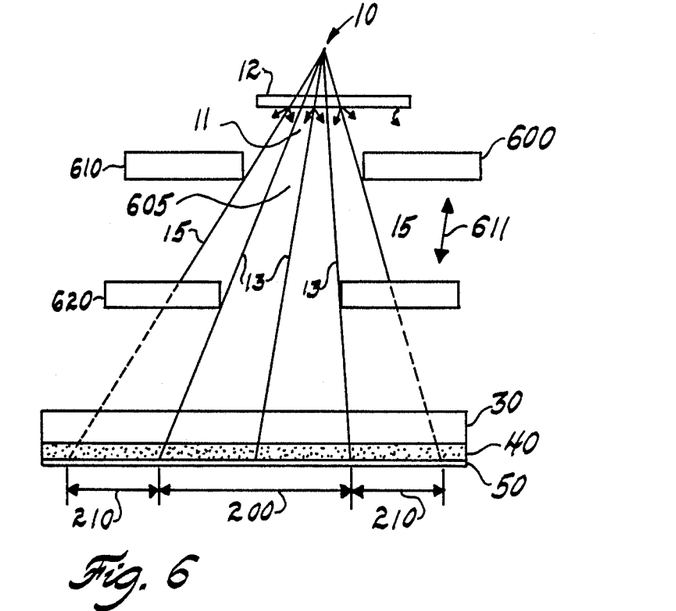
FIG. 6 illustrates the exposure of the photosensitive layer to a coherent light source through a diffuser plate having a central aperture which is moved along the path of the illumination during exposure.

FIG. 5 illustrates generally circular diffuser plate 500. Circular diffuser plate 500 includes a generally circular central aperture 510. This generally circular central aperture 510 includes a sawtooth peripheral portion 511. This sawtooth peripheral portion 511 includes teeth having their base at the outer portion of central aperture 510 with teeth coming to a point nearer the central region of central aperture 510. In use, circular diffuser plate 500 is disposed between small extended light source 11 and photosensitive layer 40 and rotated about center 515 in accordance with arrow 520. A center portion of central aperture 510 permits light to reach photosensitive layer 40 unimpeded. Light in the region of the sawtooth periphery 511 passes through diffuser plate 500 in proportion to its distance from center 515. That is, those portions nearer to center 515 receive light directly from the source to a greater proportion of the exposure time than those near the peripheral portion of sawtooth periphery 511. As a result, a generally circular holographic optical element is formed having a central portion of maximum diffraction efficiency and a peripheral portion of gradually decreasing diffraction efficiency.

It should be clearly understood that a relatively wide variety of diffuser plates with a variety of central apertures can be employed to construct the holographic optical element in accordance with the principles of the present invention. In general, any diffuser plate with an irregularly shaped central aperture can be employed. This diffuser plate may be moved in a back and forth fashion such as illustrated in FIG. 4, in a circular motion such as illustrated in FIG. 5 or in some form of elliptical motion. The primary requirement is that the motion of the diffuser plate provides a central portion in which the diffuser plate does interfere with the light the source, thereby providing the region of maximum diffraction efficiency in the completed holographic optical element. This also enables the production of the peripheral region having the gradual decreasing diffraction efficiency in the completed holographic optical element.

An alternative method of formation of the holographic optical element is illustrated in FIG. 6. FIG. 6 illustrates the coherent light source 10, the moving diffuser plate 12, the small extended light source 11, the transparent supporting substrate 30, the photosensitive layer 40 and the reflecting layer 50 as previously shown in FIG. 1. FIG. 6 illustrates moving diffuser plate 600 having central aperture 605 in two positions 610 and 620. Moving diffuser plate 600 is moved along the lines shown in arrows 611 between positions 610 and 620. When moving diffuser plate 600 is in the position 610 rays 13 and 15 can pass through central aperture 605 and illuminate photosensitive layer 40 at both the central region 200 and the peripheral regions 210. When in position 620, rays 15 pass through diffuser plate 600. This further reduces the coherence of rays 15 preventing the formation of interference fringes in photosensitive layer 40. It can be readily understood that the method illustrated schematically in FIG. 6 provides a central region 200 having maximum interference fringe contrast and peripheral regions 210 which receive direct illumination for only a fraction of the exposure time and thus have reduced interference fringe contrast. As in the methods of construction described above, the fraction of direct exposure, and hence the interference fringe contrast, decreases for the more peripheral portions. This provides the soft or smooth edge of the present invention.

In the foregoing description diffuser plates are employed to provide light modulation to adjust the interference fringe contrast. This technique is preferred in order to provide the same bias light level throughout photosensitive layer 40. The use of diffuser plates permits the same amount of light to reach all portions of photosensitive layer 40 while controlling the interference fringe contrast. This is advantageous because the dichromated gelatin typically employed to embody photosensitive layer 40 has differing development characteristics for differing levels of total light exposure. The different development characteristics could result in different swelling and/or contraction of the material. This could lead to an uneven thickness in the developed holographic optical element. If such uneven total exposure is not objectionable, for example if another type of photosensitive medium is employed, then any of the above described techniques could be employed employing opaque shutters instead of diffuser plates.

A description will now be made of the remaining steps in providing a windshield having an embedded holographic optical element in accordance with the principles of the present invention with regards to the illustrations of FIGS. 7 to 10.

Figure 7:
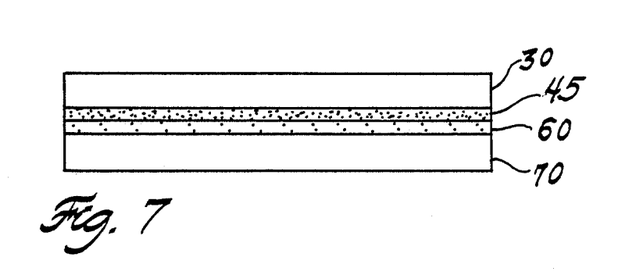
FIG. 7 illustrates an intermediate step in the construction of the holographic optical element heads up display combiner of the present invention after attachment of the transparent supporting substrate.

FIG. 7 illustrates an intermediate step in the production of the heads up display in accordance with the present invention. In FIG. 7, the photosensitive layer 40 has been developed into a holographic optical element layer 45. A transparent cover plate 70 has been adhered to the exposed surface of holographic optical element layer 45 through the use of a transparent adhesive 60. In accordance with the principles of the present invention the transparent supporting substrate 30 and the transparent cover plate 70 are generally of a thickness of at least 0.050 inches. This thickness is necessary for transparent supporting substrate 30 to provide the elimination of secondary interference fringes in accordance with the teachings of the above mentioned U.S. patent application Ser. No. 927,341.

Figure 8:
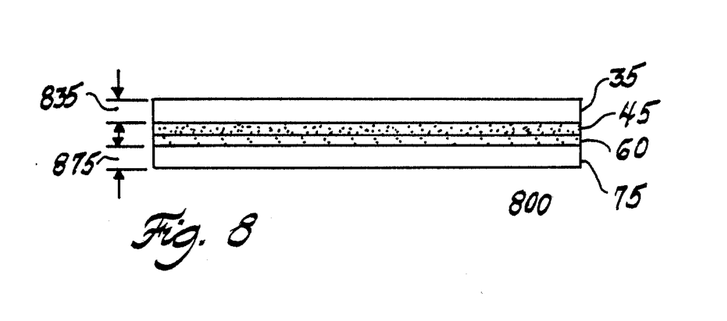
FIG. 8 illustrates the completed holographic optical element heads up display combiner after grinding of the transparent supporting substrate and the transparent cover plate.

FIG. 8 illustrates holographic optical element 800 in a further intermediate stage of construction. In accordance with the present invention transparent supporting substrate 30 has been ground to a thickness 835 and becomes ground layer 35. Similarly, transparent cover plate 70 has been ground to a thickness 875 and becomes ground layer 75. The thickness 835 of ground layer 35 and the thickness 875 of ground layer 75 is between 0.020 inches and 0.040 inches. It is believed that this thickness provides sufficient thickness and rigidity for this intermediate stage of construction.

Figure 9:
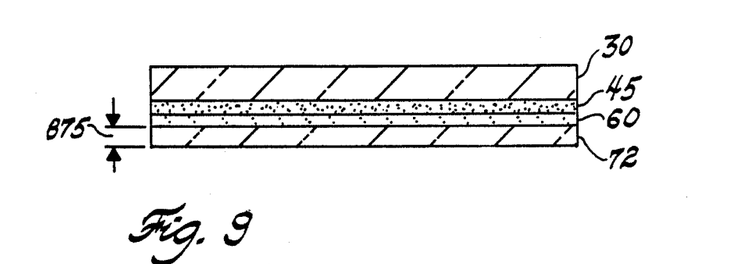
FIG. 9 illustrates an intermediate step of an alternative construction technique employing an initially thin transparent cover plate prior to grinding the transparent supporting substrate.

FIG. 9 illustrates an intermediate stage of construction in accordance to an alternative embodiment of the present invention. In this alternative embodiment transparent cover plate 72 is adhered to the exposed surface of holographic optical element layer 45 via transparent adhesive 60. Transparent cover plate 72 is a thin layer of a transparent material such as glass. Transparent cover plate 72 has an initial thickness 875 in the range of 0.020 inches and 0.040 inches. In this alternative embodiment the transparent supporting substrate 30 is then ground to the thickness 835 and becomes ground layer 35. This produces a structure similar to holographic optical element 800 illustrated in FIG. 8.

Figure 10:
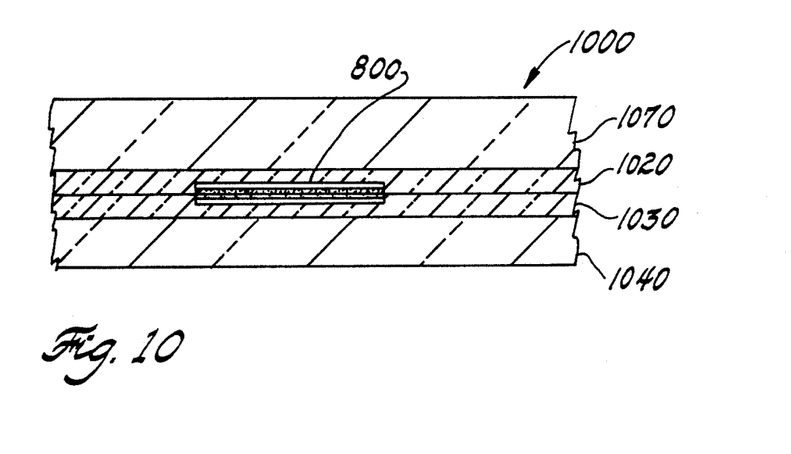
FIG. 10 illustrates the completed holographic optical element laminated between sections of windshield glass formed as safety glass.

FIG. 10 illustrates the complete construction with holographic optical element 800 embedded within windshield 1000. In accordance with the prior art windshield 1000 comprises a first glass sheet 1010 and a second glass sheet 1040 with a polyvinyl butyral laminating layer therebetween. In the present case this is constructed of a pair of polyvinyl butyral layers 1020 and 1030. The structure 1000 is constructed as follows. Firstly, the first polyvinyl butyral layer 1020 is adhered to one surface of first glass plate 1010. Holographic optical element 800 is embedded within this polyvinyl butyral laminating layer 1020 so that it is partly embedded therein (as illustrated in FIG. 10). The second polyvinyl butyral laminating layer 1030 is then applied upon the top of the first polyvinyl butyral laminating layer 1020, completely covering the holographic optical element 800. Then the second glass layer 1040 is adhered to this second laminating layer 1030, forming the completed windshield structure 1000.

I claim:

1. A holographic optical element structure comprising:
    a transparent supporting substrate having a first surface;
    a diffraction element layer disposed on said first surface of said transparent supporting substrate having interference fringes of a maximum contrast in a central portion thereof and having interference fringes of gradually decreasing contrast for more peripheral regions thereof; and
    a transparent cover plate disposed on a surface of said diffraction element layer opposite said transparent supporting substrate, whereby said diffraction element layer is enclosed between and protected by said transparent supporting substrate and said transparent cover plate wherein said transparent cover plate comprise glass layers ground to a thickness between 0.020 inches and 0.040 inches as claimed in claim 1.

2. A windshield structure for a heads up display device comprising:
    first and second glass windshield panes disposed in parallel;
    a laminating layer disposed between said first and second glass windshield panes for adhering said first and second glass windshield panes into a shatterproof combination; and
    a holographic optical element structure embedded within said laminating layer between said first and second glass windshield panes including
        a transparent supporting substrate having a first surface,
        a diffraction element layer disposed on said first surface of said transparent supporting substrate having interference fringes of a maximum contrast in a central portion thereof and having interference fringes of gradually decreasing contrast for more peripheral regions thereof, and
        a transparent cover plate disposed on a surface of said diffraction element layer opposite said transparent supporting substrate wherein said transparent supporting substrate and said transparent cover plate comprise glass layers ground to a thickness between 0.020 inches and 0.040 inches.

3. A method for making a holographic optical element comprising the steps of:
    disposing a layer of photosensitive material on one surface of a transparent supporting substrate;
    disposing a reflecting surface on the surface of said layer of photosensitive material opposite said transparent supporting substrate;
    generating a construction beam of light from a small extended light source, said construction beam having a predetermined coherence length;
    exposing said layer of photosensitive material to said construction beam thereby forming a pattern of interference fringes of a maximum contrast within said layer of photosensitive material from the interference of light directly incident to said layer of photosensitive material and light reflected from said reflecting surface, a central portion of said layer of photosensitive material being exposed during the entirety of an exposure period and peripheral portions of said layer of photosensitive material being exposed during a gradually decreasing fraction of said exposure period for locations further from said central portion, said pattern of interference fringes thereby having a maximum average interference contrast at said central portion and an average interference contrast within said peripheral portions gradually decreasing for locations further from said central portion;
    removing said reflecting layer after said exposure;
    developing said photosensitive layer after said exposure, thereby forming a holographic optical element; and
    disposing a transparent cover plate to cover and protect said developed holographic optical element.

4. The method for making a holographic optical element as claimed in claim 3, wherein:
    said step of exposing said layer of photosensitive material to said construction beam consists of the steps of
        disposing a uniform diffuser plate having a central aperture between said small extended light source of said construction beam and said layer of photosensitive material, and
        moving said diffuser plate whereby said central portion is always exposed through said central aperture and said peripheral portions are exposed through said central aperture and through said diffuser plate with a gradually decreasing fraction of exposure through said central aperature for locations further from said central portion.

5. The method for making a holographic optical element as claimed in claim 4, wherein:
    said central aperture of said diffuser plate is generally rectangular having four sides; and
    said motion of said diffuser plate is such that each of the four sides of said generally rectangular aperture are moved perpendicular to their respective lengths within the plane of said diffuser plate during some portion of the exposure.

6. The method for making a holographic optical element as claimed in claim 4, wherein:
    said central aperture of said diffuser plate is generally circular with a sawtooth shape at the periphery thereof; and
    said motion of said diffuser plate is rotation about the center of said central aperture within the plane of said diffuser plate.

7. The method for making a holographic optical element as claimed in claim 4, wherein:
    said motion of said diffuser plate is rotation about a point within said central aperture within the plane of said diffuser plate.

8. The method for making a holographic optical element as claimed in claim 4, wherein:

said motion of said diffuser plate is elliptical motion about a point within said central aperture with the plane of said diffuser plate.

9. The method for making a holographic optical element as claimed in claim 4, wherein:
said motion of said diffuser plate is reciprocating motion along the path of said construction 10. The method for making a holographic optical element as claimed in claim 3, wherein:
said step exposing said layer of photosensitive material consists of the steps of
disposing a plurality of at least three diffuser plates with interior edges thereof forming a polygon between said small extended light source of said construction beam and said layer of photosensitive material, and
reciprocally moving each diffuser plate in a direction perpendicular to said interior edge within the plane of said diffuser plate during the exposure.

11. The method for making a holographic optical element as claimed in claim 3, wherein:
said step of generating said construction beam of predetermined coherence length includes the steps of
generating a beam of highly coherent light having a long coherence length, and
reducing the coherence length of said beam of highly coherent light to a coherence length greater than the thickness of the photosensitive material along the path of the beam of light and less than the thickness of the transparent supporting substrate along the path of the beam of light.

12. The method for making a holographic optical element as claimed in claim 3, wherein:
said transparent supporting substrate and said transparent cover plate are formed of glass having a thickness of at least 0.050 inches;
said method further comprises the step of grinding said transparent supporting substrate to a thickness of between 0.020 inches and 0.040 inches; and
said method further comprises the step of grinding said transparent cover plate to a thickness of between 0.020 inches and 0.040 inches.

13. The method for making a holographic optical element as claimed in claim 12, further comprising the step of:
laminating said holographic optical element between sheets of windshield glass.

14. A method for making a holographic optical element comprising the steps of:
disposing a layer of photosensitive material on one surface of a transparent supporting substrate;
disposing a reflecting surface on the surface of said layer of photosensitive material opposite said transparent supporting substrate;
generating a construction beam of light from a small extended light source, said construction beam having a predetermined coherence length;
selectively exposing said layer of photosensitive material to said construction beam thereby forming a pattern of interference fringes of a maximum contrast within said layer of photosensitive material from the interference of light directly incident to said layer of photosensitive material and light reflected from said reflecting surface, said selectively exposing including a central portion of said layer of photosensitive material exposed to said construction beam during the entirety of an exposure time and peripheral portions of said layer of photosensitive material exposed to said construction beam during a gradually decreasing fraction of the exposure time for locations further from said central portion by selectively blocking said construction beam with an opaque plate;
removing said reflecting layer after said exposure;
developing said photosensitive layer after said exposure, thereby forming a holographic optical element; and
disposing a transparent cover plate to cover and protect said developed holographic optical element.

15. The method for making a holographic optical element as claimed in claim 14, wherein:
said step of selectively exposing said layer of photosensitive material to said construction beam consists of the steps of
disposing an opaque plate having a central aperture between said small extended light source and said layer of photosensitive material, and
moving said opaque plate whereby said central portion is always exposed through said central aperture and said peripheral portions are exposed through said central aperture for a fraction of said exposure time in proportion to the distance from said central portion.

16. The method for making a holographic optical element as claimed in claim 15, wherein:
said central aperture of said opaque plate is generally rectangular having four sides; and
said motion of said opaque plate is such that each of the four sides of said generally rectangular aperture are moved perpendicular to their respective lengths within the plane of said opaque plate during some portion of the exposure.

17. The method for making a holographic optical element as claimed in claim 15, wherein:
said central aperture of said opaque plate is generally circular with a sawtooth shape at the periphery thereof; and
said motion of said opaque plate is rotation about the center of said central aperture within the plane of said opaque plate.

18. The method for making a holographic optical element as claimed in claim 15, wherein:
said motion of said opaque plate is rotation about a point within said central aperture within the plane of said opaque plate.

19. The method for making a holographic optical element as claimed in claim 15, wherein:
said motion of said opaque plate is elliptical motion about a point within said central aperture within the plane of said opaque plate.

20. The method for making a holographic optical element as claimed in claim 15, wherein:
said motion of said opaque plate is reciprocating motion along the path of said construction beam.

21. The method for making a holographic optical element as claimed in claim 14, wherein:
said step of selectively exposing said layer of photosensitive material to said construction beam consists of the steps of
disposing a plurality of at least three opaque plates with interior edges thereof forming a polygon between said small extended light source and said layer of photosensitive material, and reciprocally moving each opaque plate in a direction perpendicular to said interior edge within the plane of said opaque plate during the exposure.

22. The method for making a holographic optical element as claimed in claim 14, wherein:

said step of generating said construction beam of predetermined coherence length includes the steps of generating a beam of highly coherent light having a long coherence length, and reducing the coherence length of said beam of highly coherent light to a coherence length greater than the thickness of the photosensitive material along the path of the beam of light and less than the thickness of the transparent supporting substrate along the path of the beam of light.

23. The method for making a holographic optical element as claimed in claim 14, wherein:

said transparent supporting substrate and said transparent cover plate are formed of glass having a thickness of at least 0.050 inches;

said method further comprises the step of grinding said transparent supporting substrate to a thickness of between 0.020 inches and 0.040 inches; and said method further comprises the step of grinding said transparent cover plate to a thickness of between 0.020 inches and 0.040 inches.

24. The method for making a holographic optical element as claimed in claim 23, further comprising the step of:

laminating said holographic optical element between sheets of windshield glass.

* * * * *

UNITED STATES PATENT AND TRADEMARK OFFICE
CERTIFICATE OF CORRECTION

PATENT NO. : 4,818,045

DATED : April 4, 1989

INVENTOR(S) : B. Jin Chang

It is certified that error appears in the above-identified patent and that said Letters Patent is hereby corrected as shown below:

Column 9, Lines 34 and 35, Please delete "as claimed in claim 1"

Signed and Sealed this

Fourth Day of August, 1992

Attest:

DOUGLAS B. COMER

Attesting Officer

Acting Commissioner of Patents and Trademarks